(12) United States Patent
Maes et al.

(10) Patent No.: US 9,898,591 B2
(45) Date of Patent: Feb. 20, 2018

(54) AUTHENTICATION METHOD FOR AUTHENTICATING A FIRST PARTY TO A SECOND PARTY

(71) Applicant: KONINKLIJKE PHILIPS ELECTRONICS N.V., Eindhoven (NL)

(72) Inventors: Maurice Jerome Justin Jean-Baptiste Maes, Eindhoven (NL); Boris Skoric, s"-Hertogenbosch (NL); Antonius Adriaan Maria Staring, Eindhoven (NL); Johan Cornelis Talstra, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 15/178,990

(22) Filed: Jun. 10, 2016

(65) Prior Publication Data
US 2016/0294816 A1 Oct. 6, 2016

Related U.S. Application Data

(60) Division of application No. 14/062,007, filed on Oct. 24, 2013, now Pat. No. 9,411,943, which is a
(Continued)

(30) Foreign Application Priority Data

Jun. 4, 2004 (EP) .................... 04102536

(51) Int. Cl.
G06F 21/10 (2013.01)
G06F 21/33 (2013.01)
(Continued)

(52) U.S. Cl.
CPC ............ G06F 21/105 (2013.01); G06F 21/10 (2013.01); G06F 21/33 (2013.01); G06F 21/44 (2013.01);
(Continued)

(58) Field of Classification Search
CPC .................................................. G06F 21/105
See application file for complete search history.

(56) References Cited

U.S. PATENT DOCUMENTS 5,949,877 A 9/1999 Traw et al.
6,601,046 B1 7/2003 Epstein
(Continued)

FOREIGN PATENT DOCUMENTS

JP 2004032706 A 1/2004
JP 2004032707 A 1/2004
(Continued)

OTHER PUBLICATIONS

Ateniese et al.; New multiparty authentication services and key agreement protocols; Published in: Selected Areas in Communications, IEEE Journal on (vol. 18 , Issue: 4 ); Date of Publication: Apr. 2000; pp. 628-639; IEEE Xplore.*
(Continued)

Primary Examiner — Bradley Holder

(57) ABSTRACT

An authentication method authenticates a first party to a second party, where an operation is performed on condition that the authentication succeeds. If the first party is not authenticated, then if the first party qualifies for a sub-authorization, the operation is still performed. Further, a device that includes a first memory area holding a comparison measure, which is associated with time, and which is also used in said authentication procedure, a second memory area holding a limited list of other parties which have been involved in an authentication procedure with the device, and
(Continued)

a third memory area, holding compliance certificates concerning parties of said list.

3 Claims, 2 Drawing Sheets

Related U.S. Application Data continuation of application No. 11/569,974, filed as application No. PCT/IB2005/051758 on May 30, 2005, now Pat. No. 8,689,346.

(51) Int. Cl.
  *G06F 21/44* (2013.01)
  *H04L 29/06* (2006.01)
(52) U.S. Cl.
  CPC ...... *H04L 63/0823* (2013.01); *H04L 63/0853* (2013.01); *G06F 2221/0764* (2013.01); *G06F 2221/0771* (2013.01); *G06F 2221/2129* (2013.01); *G06F 2221/2137* (2013.01)

(56) References Cited

U.S. PATENT DOCUMENTS

| | | | | |
|---|---|---|---|---|
| 7,099,479 B1* | 8/2006 | Ishibashi | | G06F 21/10 380/203 |
| 7,287,282 B2* | 10/2007 | Yamada | | G06F 21/445 380/201 |
| 7,376,975 B2* | 5/2008 | Lafornara | | H04L 9/0825 726/2 |
| 7,415,439 B2* | 8/2008 | Kontio | | G06F 21/10 705/51 |
| 2001/0045451 A1* | 11/2001 | Tan | | G06F 21/33 235/375 |
| 2002/0057778 A1 | 5/2002 | Vehmaa et al. | | |
| 2002/0108108 A1* | 8/2002 | Akaiwa | | G03B 21/14 725/30 |
| 2002/0186688 A1* | 12/2002 | Inoue | | H04Q 3/0087 370/352 |
| 2003/0110378 A1* | 6/2003 | Yamada | | G06F 21/445 713/161 |
| 2003/0130567 A1* | 7/2003 | Mault | | A61B 5/0022 600/300 |
| 2004/0003239 A1* | 1/2004 | Ohmori | | G11B 20/00086 713/158 |
| 2004/0024549 A1* | 2/2004 | Egan | | H04N 1/00127 702/79 |
| 2004/0059879 A1* | 3/2004 | Rogers | | G06F 12/0811 711/154 |
| 2004/0093523 A1* | 5/2004 | Matsuzaki | | G06F 21/10 726/10 |
| 2005/0091522 A1* | 4/2005 | Hearn | | G06F 21/575 726/26 |
| 2005/0216730 A1* | 9/2005 | Morino | | H04L 63/061 713/153 |
| 2005/0220304 A1* | 10/2005 | Lenoir | | G06F 21/445 380/255 |
| 2005/0228859 A1* | 10/2005 | Maeda | | H04N 5/91 709/203 |
| 2005/0257260 A1* | 11/2005 | Lenoir | | G11B 20/00086 726/21 |
| 2005/0257271 A1* | 11/2005 | Lafornara | | H04L 9/0825 726/26 |
| 2006/0015938 A1* | 1/2006 | Wlodarczyk | | G06F 21/34 726/22 |

FOREIGN PATENT DOCUMENTS

| | | |
|---|---|---|
| JP | 2005130445 A | 5/2005 |
| WO | 200072649 A | 12/2000 |
| WO | 2003010789 A1 | 2/2003 |
| WO | 2003098931 A1 | 11/2003 |
| WO | 2003107588 A | 12/2003 |
| WO | WO 03/107588 A1 * | 12/2003 |
| WO | 2004027588 A1 | 4/2004 |
| WO | 2004044717 A | 5/2004 |
| WO | WO 2004/038652 A1 * | 5/2004 |
| WO | 2005010879 A2 | 2/2005 |
| WO | 2005071515 A1 | 8/2005 |
| WO | 2005088896 A1 | 9/2005 |
| WO | 2005091554 A1 | 9/2005 |

OTHER PUBLICATIONS

Woo et al.; A framework for distributed authorization; Published in: Proceeding CCS '93 Proceedings of the 1st ACM conference on Computer and communications security; 1993; pp. 112-118; ACM Digital Library.*

Morogan et al: "Certificate Management in Ad Hoc Networks"; Applications and the Internet Workshops, Proceedings IEEE, Jan. 27, 2003, pp. 337-341.

S.A.F.A. Van Den Heuvel et al: "Secure Content Management in Authorised Domains"; Philips Research, NL. Proc IBC 2002, pp. 467-474, Sep. 2002.

Ateniese et al: New Multiparty Authentication Services and Key Agreement Protocols; Published in: Selected Areas in Communications, IEEE Journal on (vol. 18, Issue 4); Date of Publicaton, Apr. 2000, pp. 628-639; IEEE Xplore.

Woo et al: A Framework for Distributed Authorization; Published in:Proceeding CCS'93 Proceedings of TEH 1st ACM Conference on Computer and Communications Security; 1993; pp.112-118; ACM Digital Library.

* cited by examiner

AUTHENTICATION METHOD FOR AUTHENTICATING A FIRST PARTY TO A SECOND PARTY

This is a divisional application of prior U.S. patent application Ser. No. 14/062,007, filed Oct. 24, 2013, which was a continuation of prior U.S. patent application Ser. No. 11/569,974, filed May 30, 2005, now U.S. Pat. No. 8,689, 346.

The present invention relates to copy protection systems, and more particularly to a authentication method for authenticating a first party to a second party, where an operation is performed on condition that the authentication succeeds.

In various Copy Protection Systems (CPS) where the content has to be transferred across a publicly accessible communication channel, such as an insecure link between computers or a drive/host interface in a PC, a procedure occurs where a hardware device and a software application have to prove to each other that they are trustworthy. This procedure is called authentication. An important step in the authentication procedure is a mutual exchange of Public Key certificates. A public key certificate is a short statement, digitally signed by a well-known and trusted Certification Authority (CA), that attests to the fact that a certain device or application with an identification number ID has a public key (PK). Below, both the device and the application will also be referred to as parties. The PK of the CA is commonly known, and can be used by any party to verify the signature of the CA on the certificate.

To enable this process, each party holds a number of secret keys called Private Keys. These keys and the control flow using them should be well protected in order to prevent hackers from circumventing the CPS. However, in the long run, it is likely that some or even many devices as well as applications, such as playback software, are hacked, and thereby unauthorised content copying is performed.

In order to make such unauthorised copying more difficult, so-called revocation has come to use. A Certificate Revocation List (CRL) is prepared, containing information about which parties are revoked. As a part of the authentication procedure, all parties are forced to read the CRL, and if at least one of the two interacting parties is revoked the procedure is interrupted. There are two kinds of CRLs. A White List (WL) lists all parties that are compliant at a certain point of time. A Black List (BL) lists all devices that have been revoked. For the purposes of this application there is no difference in the information that the WL and the BL contain, since knowledge of all revoked devices determines which are still compliant, and vice versa.

However, there are differences in how they are interpreted and used. When using a BL, a first party, or verifying party, that wishes to determine that a second party, or proving party, is not revoked, has to obtain the complete BL. When using a WL, the verifying party only has to obtain that part of the WL which refers to the proving party. Therefore the use of a White List is advantageous in terms of storage requirements and bus-transmission loads in the CPS. This is of particular importance when the verifying party is a device having little computing power, such as an optical drive. Processing and parsing a long BL would be burdensome for such a device.

However, simple white-listing requires that every party gets its own certificate attesting to its state of non-revocation, resulting in excessive network or disc-storage overhead. To mitigate this drawback, a two-step approach as disclosed in International Patent Publication No. WO2003/107588A1 and International Patent Publication No. WO2003/107589A2 is useful. The proving party not only supplies its Public Key Certificate, but also a Groups Certificate (GC). The GC is a concise proof of the fact that one or more groups, to one of which the proving party belongs, has not been revoked. The same GC can be used by many parties, i.e., all parties that are mentioned in the GC. Effectively, the entire CRL has been split into GCs, which are individually signed and which are distributed to the communicating parties.

One way of using the GCs, according to the above-mentioned International Patent Publications, is to indicate the upper and lower boundaries of each group represented in the GC. When a party in a particular group loses its status as authorized party, one or more new GCs will be generated. A further improvement is described in International Patent Publication No. WO2005/091554A1. This improvement comprises generating a run-length encoded representation of an authorization status of a number of devices.

In order to have a good hacker-preventing effect by using the GCs, the parties should be forced to use fairly recent GCs, in order to use revocation information that is not out of date. Otherwise, the revocation tool is of little use. In U.S. Pat. No. 5,949,877, a method wherein relative creation dates of CRLs are compared is disclosed. The revocation list of a verifying party is up-dated when the party receives a more recent list.

In an implementation of the intentions of U.S. Pat. No. 5,949,877, each GC carries a Sequence Number (SeqNo) indicating the time when the GC was created by the CA. Thus, a higher SeqNo corresponds to a more recent time. Typically, as exemplified above, a new set of GCs is generated after a revocation, each GC carrying an increased SeqNo. Compliant parties have to compare the SeqNo of a received GC to some measure of "freshness". Typically, this measure is a validity number (VN), such that GCs with SeqNo VN will be accepted as valid certificates, and GCs with SeqNo<VN will be rejected. There are several ways for a party to encounter new GCs and VNs, such as via online connections, via discs and by contact with other parties. All compliant parties cache a VN, possibly the highest one encountered so far. Due to the disparity in processing power between PCs and, at least some, typically low-power, peripherals, such as, for example, optical devices, the storing of GCs is differently handled. Thus, applications cache a complete set of GCs carrying the highest SeqNo encountered so far, while such peripherals do not cache GCs.

However, the use of VNs may cause undesired situations. Consider, for example, a comparison of SeqNo and VN in a playback situation. As a first approach, assume that a drive always caches the highest SeqNo it has ever seen into a VN register thereof, and that the drive, during the authentication procedure, demands that the GC of the playback application has SeqNo≥VN. This way of using SeqNos and VNs is, for example, considered as an option for a BD-ROM (Blue-ray Disc ROM) standardization. Then, serious user annoyance could occur in off-line situations as will be described below.

Now consider an alternative use of the SeqNo–VN in accordance with a second approach. During the authentication procedure for playback, a drive uses the VN delivered through the disc, which is to be played. The GC of the application is only accepted if it has SeqNo≥$VN_{disc}$. This approach is in a way more user friendly.

However, from the content owners' point of view, the second approach has a serious drawback. If an application "App" gets hacked, its secrets can be used to construct a content-stealing hacker application "Rip", which is then distributed over Internet. The CA will revoke App by listing App as non-authorized in all future WLs; say App is still authorized in GCs with SeqNo=X, but revoked in all GCs with SeqNo>X. Then, in spite of this revocation, Rip can always be used to steal content from all discs with $VN_{disc} \leq X$. In the first approach this is much more difficult, since the hacker would have to isolate his drive from all new discs.

Consider again the first approach. A user with a laptop and a playback software App has bought a new disc. It turns out that the disc has a VN that is higher than the SeqNo of App, and thus App is refused. The user will then have to update App by downloading (possibly for free) a replacement software. However, if the user does not have access to Internet at the moment, which would occur rather frequently for a laptop owner, no update is possible. In addition to the annoyance that this may cause, the user will not be able to play any old discs either, since the disc drive of the laptop has cached the VN of the disc and will not allow App to run. In other words, the discs that have always worked suddenly stop working, until the user has been able to download the updated software. There are several other, rather common, situations where the VN of the drive will be increased such that the running of a software application becomes blocked until the user has been able to update the application. One such situation is where a removable drive is communicating with an application that has a SeqNo that is higher than VN of the drive, while interacting with another PC. Another such situation is where multiple software applications on the same PC are communicating with the same drive but are not keeping an equal pace.

Even though the first approach sometimes will result in a situation where the user's application stops working although it is not even revoked, it will most probably be used. Then there will arise a demand for a development that reduces the user annoyance.

It is an object of the present invention to provide an authentication method that better than the prior art described above serves the purposes of both users and content owners.

Thus, in a first aspect thereof, the invention provides for an authentication method for authenticating a first party to a second party, where an operation is performed on condition that the authentication succeeds, comprising the steps of:

verifying whether the first party is authenticated; and
if the first party is not authenticated, then qualifying the first party for a sub-authorization, wherein, if the first party qualifies for the sub-authorization, then still the operation will be performed.

Authenticated means that a set (one or more) of primary or main criteria that are checked during the authentication procedure are complied with. If the first party, such as a software application, or a device, is not authenticated, the conditional operation may still be performed, under certain conditions. If those certain conditions are met, a sub-authorization is granted.

Thereby, this method, for example, allows the use of at least some applications that would have been refused in the prior art methods. By appropriate choices of the conditions for sub-authorization, the above-mentioned off-line user annoyance is avoided. Implementation examples are evident from embodiments as follows.

According to an embodiment of the authentication method, a compliance certificate is involved in the authentication procedure. Thus, only compliant parties are authenticated.

According to an embodiment of the authentication method, a date of issuance measure that is included in the certificate is also involved in the authentication procedure.

The date of issuance measure is related to time, such as the date when the certificate was issued. For example, the date of issuance measure could be a sequence number that is incremented every time a new certificate is issued.

According to an embodiment of the authentication method, the qualification for sub-authorization is dependent on the result of the comparison. For example, by a proper choice of the comparison measure, one use of the measures is to control the age of the certificates that are accepted.

According to an embodiment of the authentication method, a range of allowed validity numbers is defined. This range is usable for defining upper and lower limits, which narrows the possibilities for granting a sub-authorization, even though it is included in the definition that the range may cover any part (or even all) of the existing series of numbers.

According to an embodiment of the authentication method, a minimum validity number is defined. If the date of issuance measure is lower than that minimum validity number no sub-authorization is granted. This is preferably used for preventing that parties having far too old certificates are granted a sub-authorization.

According to an embodiment of the authentication method, the first party is qualified for a sub-allowance although it is not compliant according to the certificate. However, the sub-authorization is only granted provided that the date of issuance measure is high enough, i.e., that the certificate, and consequently, the non-compliance, is recent enough. Of course, again, the maximum value is not specified but preferably it is chosen comparatively high.

According to an embodiment of the authentication method, two different validity numbers, i.e., a current number and a previous number, of the second party are used as the limit values of the range. Thereby it is possible to make the range dependent on updates of the validity numbers of the second party.

According to an embodiment of the authentication method, a grace-counter is used for controlling the number of times that the first party, and other first parties, if any, are being sub-authorized. In an embodiment, the counter is decremented every time the first party is granted a sub-authorization. For example, this can be used for setting, at some point of time, the counter to a predefined number, and stop granting the sub-authorization when the counter reaches zero. In order for the first party to again be authenticated or sub-authorized, it has to renew the certificate.

In a second aspect thereof, the present invention provides for a digital device that is arranged for acting as a party in an authentication process, in which compliance certificates are used for determining the compliance of parties involved in the authentication process. The device comprises a first memory area holding a comparison measure, which is associated with time, and which is also used in said authentication process, a second memory area holding a limited list of other parties which have been involved in an authentication process with the device, and a third memory area, holding compliance certificates concerning parties of said list.

According to this second aspect, the invention substantially reduces the user annoyance when the device is off-line, at least as regards the problems encountered due to a certificate that is a bit old. Although the memory is limited, the likelihood is high that a certificate, which concerns the party to be engaged in the authentication procedure with the digital device, is updated concurrently with the comparison number of the digital device. Since the certificate is then accessible for that party, the likelihood of a successful authentication procedure is high as well. It is to be noted that the teachings of this second aspect are useable in combination with the teachings of the first aspect. In a third aspect thereof, the present invention provides for an authentication method for authenticating a first party to a second party, comprising the steps of:

verifying whether the first party is authenticated; and
if the first party is not authenticated, entering an identification of the first party into a local storage holding a list of non-authenticated first parties, which storage is accessible to the second party,
wherein said step of verifying comprises a step of verifying whether the first party is a member of said list.

According to this third aspect, locally there is kept a kind of revocation list of non-authenticated parties, which list is accessible for at least the second party. Thus, the invention is advantageous, among other things, from a content owner perspective. A party that once has been entered in the list is not useable irrespective of type of content or content carrier. For example, the drawback of the second approach discussed above under the background of the invention, is eliminated.

These and other aspects of the invention will be apparent from and elucidated with reference to the embodiments described hereinafter.

The invention will now be described in more detail and with reference to the appended drawings in which.

A first party and a second party are to get involved in an authentication procedure, where an operation is to be performed if the authentication succeeds. For exemplifying purposes, in a first embodiment of the method according to the present invention, it is assumed that the first party is a software application, that the second party is a device, and that the operation to be performed is accessing content. More particularly, it is assumed that the application wants to access content, which access is conditionally approved by the device.

As part of the authorization of access to the content, the usage rights information associated with the content may need to be updated. For example, a counter indicating how many times the content may be accessed may need to be decreased. A one-time playback right may need to be deleted or have its status set to 'invalid' or 'used'. A so-called ticket could also be used. See U.S. Pat. No. 6,601,046 for more information on ticket-based access. This updating of the usage rights may be done by the first party or by the second party.

As understood by the skilled person, there are numerous combinations of different types of parties and different types of operations, etc., that are encompassed by the scope of the present invention. A few more examples are authentication procedures between mobile devices and stationary devices, and between PCs and servers in a network.

Figure 1:
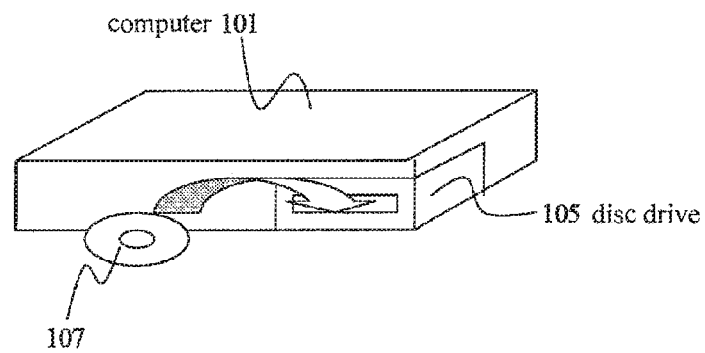
FIG. 1 shows, in a perspective view, a system wherein the method according to the present invention is employed.
Figure 2:
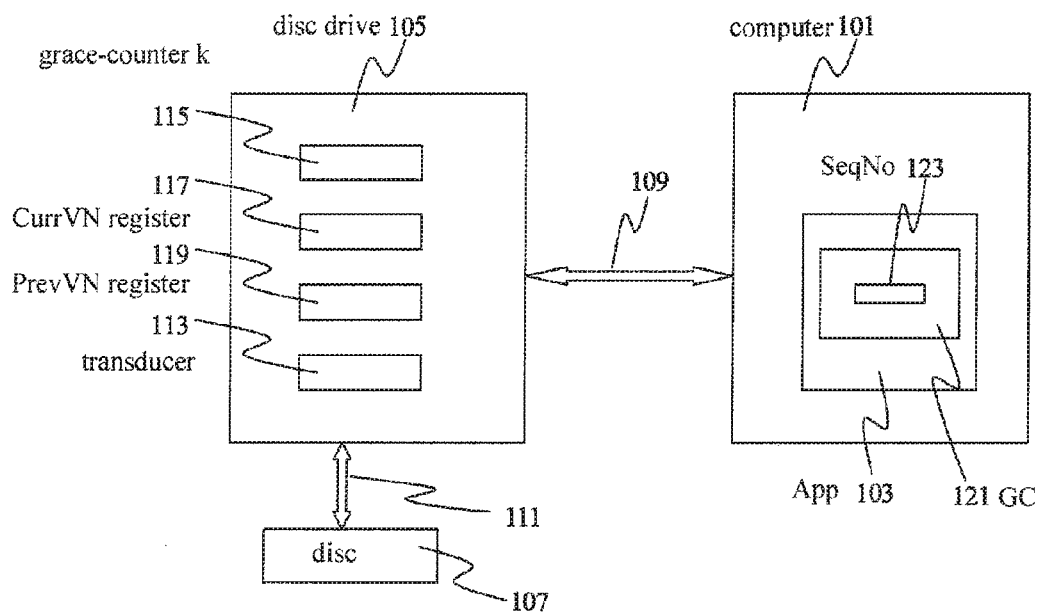
FIG. 2 is a block diagram illustrating how an embodiment of the method works in the system of FIG. 1.

When a software application is to be used for accessing content on a content unit received by a device, an authentication procedure is taking place in order to authorize the application for such an access. A typical situation, as will be assumed when describing this embodiment, is where the application is used for playing back content that is stored on a content unit constituted by a disc, which is input into a device constituted by a disc drive. For enhancing the understanding of this embodiment, a system as shown in FIG. 1 and FIG. 2 is considered. The system comprises a computer, such as a laptop, 101, having the application (App) 103 installed therein, and a removable disc drive 105 connected thereto. A disc 107 is going to be inserted into the disc drive 105. The drive 105 communicates with the computer 101 via an interface bus 109, and the content of the disc 107 is transferred to the drive 105 via an optical link 111. Typically, the contents on the disc is optically scanned and converted to electronic signals by means of an opto-electronic transducer 113.

The drive 105 has a grace-counter k 115, a Current Validity Number (CurrVN) register 117, and a Previous Validity Number (PrevVN) register 119. The application App 103 holds a compliance certificate that is a Groups Certificate (GC) 121 of a group of applications and devices that includes App 103. The GC 121 has a date of issuance measure that is a Sequence Number (SeqNo) 123, the value of which is dependent on the point of time when the GC 121 was generated. The contents of the CurrVN and PrevVN registers 117, 119 is comprised in a comparison measure which is used for comparisons with the date of issuance measure, i.e., the Sequence Number, as will be explained below.

When a disc 107 is inserted into the drive 105, and it is decided that App 103 should be used for playing back the contents of the disc 107, an authentication procedure is initiated. The disc 107 comprises a Validity Number VN that is presented to the drive 105. Further it comprises a complete set of GCs, i.e., all certificates issued so far. The VN is compared to the CurrVN 117 of the drive 105. Generally, if the disc is new VN>CurrVN. Then, the CurrVN register 117 is updated with VN, and the set of GCs is stored in the drive, and/or in a device, such as a PC, that the drive 105 is mounted in or connected to. As a part of the authentication procedure, App 103 has to prove to the drive 105 that it is authenticated to be used for accessing the content. In the above-mentioned basic case, the SeqNo of the GC 121 is compared to CurrVN, it is determined that they are equal, it is also determined that App is still compliant according to the new GC concerning App 103, and consequently it is verified that App 103 is authenticated. Thus, App is allowed to access the contents on the disc 107.

However, in several situations, as also described in the background above, there is no full update of CurrVN and GCs, for example due to lack of memory resources in the drive 105 preventing the copying of new GCs, while CurrVN is updated with a higher VN. Also if App is no longer compliant according to the new GC, it is not authenticated.

According to the present method, in specific circumstances, although App is not authenticated, access is still permitted. For the purposes of this application this is called sub-authorization. However, since a sub-authorization gives the application the same advantages as if it were authenticated, although the criteria for the authentication are not complied with, some limitations are associated with the grant of the sub-authorization, making it dependent on time and number. Thus, the Sequence Number and the Validity Numbers are elements associated with time, since the values thereof are dependent on when in time they were generated. As such they can be used to determine a grace-period, as will be described below. The grace-counter k is the number element, but is also related to time in a way, since when it has counted to an end number an amount of time, though generally indefinite, has passed. This will be evident from the description below.

As a first step of said authentication procedure SeqNo 123 is compared to CurrVN 117. If SeqNo>CurrVN, then:
   the value of CurrVN is stored in PrevVN;
   the value of SeqNo is stored in CurrVN; and
   the grace-counter k is set to k0,
   where k0 indicates a predefined number of playbacks under a sub-authorization, as will be explained below. Then it is checked whether the GC of App indicates that App is compliant, or non-revoked. If App is non-revoked, then it is determined, by the drive 105, that App is authenticated and the access to the content, i.e. playback, is admitted. If, on the other hand, App is revoked, a sub-authorization will be granted. Then playback will still be allowed, but only for k0 times. To that end, as a step of this part of the authentication, k is decremented, i.e. k→k−1.

If SeqNo<CurrVN, then in a next step SeqNo 123 is compared to PrevVN 119. If SeqNo<PrevVN, then App 103 is not authenticated to the drive 105. Thus, the user can not access the content until the software application App 103 has been updated to a more recent version having a GC carrying a high enough SeqNo.

If SeqNo 123 is included in the range of validity numbers, i.e. if PrevVN≤SeqNo<CurrVN, regardless of the state of revocation, in a next step it is checked whether k>0. If it is, then App is qualified for a sub-authorization, k is decremented and playback is allowed. If k=0, then no sub-authorization is granted and access to the content is denied. The outcome is the same for the combination of SeqNo=CurrVN, and App 103 being revoked. Finally, if SeqNo=CurrVN, and App is non-revoked, then App is authenticated. The counters are not modified.

The value of PrevVN determines how old an application can be and still be usable. However, since PrevVN is just one number behind of CurrVN in a typical case with a user that continuously uses new discs nothing but rather new applications will be useful. In an alternative embodiment, the minimum validity number of the range is not PrevVN but Previous Previous Validity Number PrevPrevVN, that is one step further behind of CurrVN. In this embodiment PrevPrevVN is used for the comparisons with SeqNo instead of PrevVN. An advantage is a higher probability that the user can keep using his accustomed playback application during the grace-period, while still preventing the use of very old hacking tools.

In another alternative embodiment, the PrevVN counter does not exist. This corresponds to fixing PrevVN permanently to zero. In this embodiment it is absolutely certain that the user can keep using his accustomed playback application during the grace period.

Figure 3:
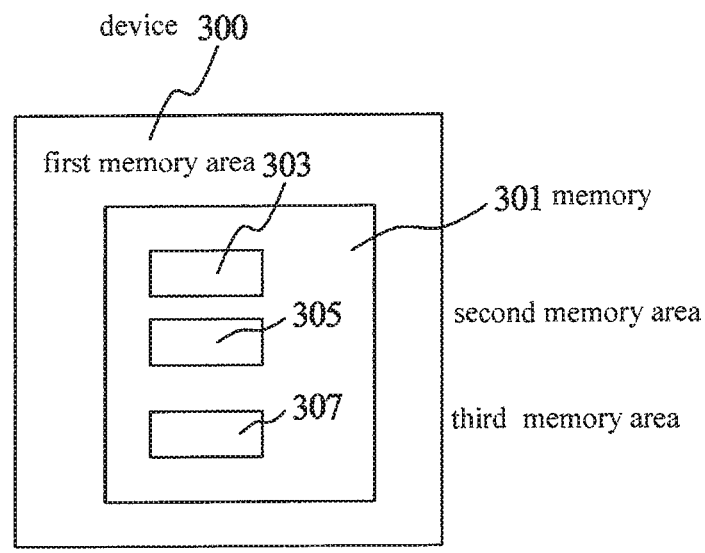
FIG. 3 is a block diagram of relevant parts of an embodiment of a digital device according to the present invention.

In an embodiment of a digital device according to this invention, the digital device 300 is a device of a low-resource type, such as a typical optical drive. It has too little memory capacity to store, usually in a cache memory, the complete list of GCs. However, it has a limited amount of memory 301, and more particularly a Non-Volatile Random Access Memory (NVRAM), which is capable of holding a few GCs. In addition the drive 300 keeps a list of parties, i.e., applications or devices, with which it has engaged into an authentication procedure. Preferably, this list is a First-In-First-Out (FIFO) list, since over time, typically, it can only contain a part of all parties. As shown in FIG. 3, the drive 300 has a first memory area 303 holding a comparison measure, which in this embodiment is a validity number VN, a second memory area 305 holding the FIFO list, and a third memory area 307, holding GCs concerning parties of the FIFO list at 305.

When the drive 300 updates its VN it also caches GCs concerning the parties on the FIFO list in the third memory area 307. When a party of the FIFO list engage in an authentication procedure with the drive 300, like above, the SeqNo of the corresponding GC is compared with the VN of the drive 300. In order for the party to be authenticated, it has to be noted as compliant on the GC, and SeqNo≥VN has to be satisfied. Typically, since the party is on the FIFO list its GC has been updated in conjunction with the VN of the drive 300, and thus its SeqNo is high enough. However, if the party is not on the FIFO list, there is an increased likelihood for unsuccessful authentication. It is to be noted that, in this embodiment of the device, the very authentication procedure that the device initiates or engages in can be as in any of the embodiments described above.

Figure 4:
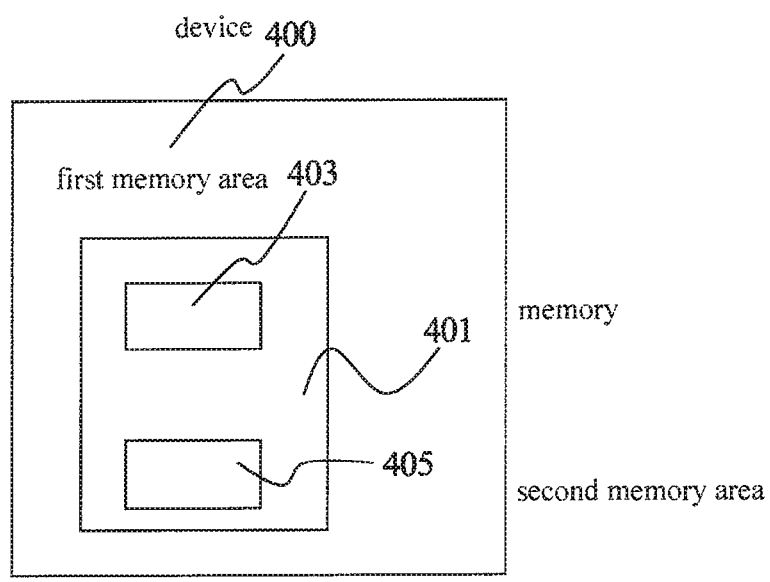
FIG. 4 is a block diagram of relevant parts of an embodiment of a device, which is arranged to employ another embodiment of an authentication method.

In accordance with the present invention, there is also provided an authentication procedure between first and second parties, wherein it is verified whether the first party is authenticated. If the first party is not authenticated, an identification of the first party is entered into a local storage holding a list of non-authenticated first parties, which storage is accessible to the second party. The verifying comprises a compliance check and a check of whether the first party is a member of the non-authentication list. This local list can be regarded as a local BL. A device being equipped and acting according to this embodiment is most schematically shown in FIG. 4. The device 400, such as an optical disc drive, has a memory 401 comprising a first memory area 403, holding a validity number VN, and a second memory area 405 holding the local BL. Whenever a first party, such as an application, fails to authenticate to the drive 400 its identification (ID) is stored in the local BL at the second memory area 405. Whenever an application tries to authenticate to the drive 400, using a GC saying that it is compliant, and comprising a SeqNo≥VN, the drive checks whether the application occurs on the local BL. If so, the drive 400 aborts authentication, otherwise the application is authenticated. This embodiment is of particular value if the first memory is volatile and takes the value of the VN available on the currently present disc.

The method is implementable as a computer program which comprises executable code portions that perform the steps according to the method. The program is loaded into, and executed by, the device, such as the disc drive described above, which has the role of verifying the compliance of the software application.

The invention may find application in home networks. A typical home network includes a number of devices, e.g., a radio receiver, a tuner/decoder, a CD player, a pair of speakers, a television, a VCR, a digital recorder, a mobile phone, a tape deck, a personal computer, a personal digital assistant, a portable display unit, and so on. These devices are usually interconnected to allow one device, e.g., the television, to control another, e.g., the VCR. One device, such as, e.g., the tuner/decoder or a set-top box (STB), is usually the central device, providing central control over the others. Content, which typically comprises things like music, songs, movies, TV programs, pictures, games, books and the likes, but which also may include interactive services, is received through a residential gateway or set-top box. Content could also enter the home via other sources, such as storage media like discs or using portable devices.

The home network may operate as an Authorized Domain. In this kind of content protection systems (like SmartRight from Thomson, or DTCP from DTLA) a set of devices can authenticate each other through a bi-directional connection. Based on this authentication, the devices will trust each other and this will enable them to exchange protected content. In the licenses accompanying the content, it is described which rights the user has and what operations he/she is allowed to perform on the content.

Some particular architectures of authorized domains have been outlined in International Patent Publication No. WO2003/098931A1, International Patent Publication No. WO2004/027588A1, International Patent Publication No. WO2005/010879A2, International Patent Publication No. WO2005/088896A1 and F. Kamperman and W. Jonker, P. Lenoir, and B. vd Heuvel, "Secure content management in authorized domains", Proc. IBC2002, pages 467-475, September 2002.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A digital device arranged for acting as a party in a current authentication procedure in which certificates are used for determining compliance of parties involved in the current authentication procedure, wherein the digital device comprises:

a first memory area for holding a comparison measure, which is concerned with time, and which is used in said current authentication procedure;

a second memory area for holding a limited list of other parties which have been involved in authentication procedures with the digital device;

a third memory area for holding compliance certificates with dates of issuances concerning the other parties of said limited list; and a grace-counter set to a predetermined number equal to a number of times that the party is allowed to be sub-authorized after failing the current authentication procedure and configured to be decremented when a date of issuance of a compliance certificate concerning the party is compliant with the comparison measure stored in the first memory area, wherein the digital device is configured to:

communicate to a further digital device compliance information for the current authentication procedure indicative of the compliance of the parties, update the first memory with a more recent comparison measure, when said more recent comparison measure is available, and in conjunction with said update, update the third memory area with more recent compliance certificates concerning the other parties of said limited list.

2. The digital device as claimed in claim 1, wherein the digital device is arranged for:

updating the other parties of said limited list with a current party involved in the current authentication procedure.

3. The digital device of claim 1, wherein the grace-counter is set to the predetermined number when the party is authenticated.

* * * * *